(12) United States Patent
Stoyanov et al.

(10) Patent No.: US 10,839,333 B2
(45) Date of Patent: Nov. 17, 2020

(54) GOAL MANAGEMENT SYSTEM AND METHODS OF OPERATING THE SAME

(71) Applicant: Center for Independent Futures, Evanston, IL (US)

(72) Inventors: Dimitar Stoyanov, London (GB); M. Charlie Egan, Winnetka, IL (US)

(73) Assignee: CENTER FOR INDEPENDENT FUTURES, Evanston, IL (US)

( * ) Notice: Subject to any disclaimer, the term of this patent is extended or adjusted under 35 U.S.C. 154(b) by 780 days.

(21) Appl. No.: 15/004,049

(22) Filed: Jan. 22, 2016

(65) Prior Publication Data

US 2016/0217409 A1    Jul. 28, 2016

Related U.S. Application Data

(60) Provisional application No. 62/106,996, filed on Jan. 23, 2015.

(51) Int. Cl.
| | | |
|---|---|---|
| *G06Q 10/00* | (2012.01) | |
| *G06Q 10/06* | (2012.01) | |
| *G06F 16/904* | (2019.01) | |
| *G06F 16/903* | (2019.01) | |
| *G09B 7/00* | (2006.01) | |
| *G09B 5/00* | (2006.01) | |
| *G07C 13/00* | (2006.01) | |
| *H04L 12/24* | (2006.01) | |

(52) U.S. Cl.
CPC ..... *G06Q 10/06398* (2013.01); *G06F 16/904* (2019.01); *G06F 16/90335* (2019.01); *G06Q 10/063112* (2013.01); *G09B 5/00* (2013.01); *G09B 7/00* (2013.01); *G07C 13/00* (2013.01); *H04L 41/04* (2013.01)

(58) Field of Classification Search
None
See application file for complete search history.

(56) References Cited

U.S. PATENT DOCUMENTS

| | | | | |
|---|---|---|---|---|
| 5,274,749 A | * | 12/1993 | Evans | G06F 17/274 |
| | | | | 706/55 |
| 5,788,504 A | * | 8/1998 | Rice | G09B 19/0069 |
| | | | | 434/219 |
| 7,264,475 B1 | * | 9/2007 | Eck | G09B 5/00 |
| | | | | 434/322 |
| 9,671,786 B2 | * | 6/2017 | Baltes | G05D 1/0274 |
| 2003/0236700 A1 | * | 12/2003 | Arning | G06F 16/951 |
| | | | | 705/347 |
| 2004/0058302 A1 | * | 3/2004 | Mayer | G06Q 10/06311 |
| | | | | 434/219 |
| 2008/0077530 A1 | * | 3/2008 | Banas | G06Q 10/06 |
| | | | | 705/50 |
| 2009/0306823 A1 | * | 12/2009 | Baltes | G05D 1/0274 |
| | | | | 700/245 |

(Continued)

*Primary Examiner* — Gurkanwaljit Singh
(74) *Attorney, Agent, or Firm* — Neal, Gerber & Eisenberg LLP

(57) ABSTRACT

A goal tracking system including a goal retrieval unit that retrieves a listing of goals, with each goal having at least one prerequisite, and retrieves a listing of completed goals related to a user, a goal analysis unit that compares the completed goal of the user with the prerequisite of the goal and determines if the user is qualified to achieve at least one goal from the listing of goals based on the completed goals of the user.

20 Claims, 4 Drawing Sheets

(56) References Cited

U.S. PATENT DOCUMENTS

| | | | | |
|---|---|---|---|---|
| 2010/0287105 A1* | 11/2010 | Araki | ............ | G06Q 10/06 |
| | | | | 705/300 |
| 2011/0306028 A1* | 12/2011 | Galimore | ......... | G06Q 10/06311 |
| | | | | 434/322 |
| 2013/0166332 A1* | 6/2013 | Hammad | ............ | G06Q 40/10 |
| | | | | 705/5 |
| 2016/0180248 A1* | 6/2016 | Regan | ............ | G09B 5/00 |
| | | | | 706/12 |

* cited by examiner

GOAL MANAGEMENT SYSTEM AND METHODS OF OPERATING THE SAME

CROSS-REFERENCE TO RELATED APPLICATIONS

This application is a non-provisional patent application that claims the benefit of and the priority from U.S. Provisional Patent Application No. 62/106,996, filed Jan. 23, 2015, titled GOAL MANAGEMENT SYSTEM AND METHODS OF OPERATING THE SAME.

BACKGROUND OF THE INVENTION

More and more organizations are concerned with the training and accomplishments of their members, clients and employees. Typically, managers or couches of employees, members or clients of organizations manage assigned goals. However, the prior achievements of an individual may not be emphasized or known by managers. Therefore, a need exists for a system that will track and recommend new goals for users.

BACKGROUND OF THE INVENTION

One embodiment of the present disclosure includes goal tracking system including a goal retrieval unit that retrieves a listing of goals, with each goal having at least one prerequisite, and retrieves a listing of completed goals related to a user, a goal analysis unit that compares the completed goal of the user with the prerequisite of the goal and determines if the user is qualified to achieve at least one goal from the listing of goals based on the completed goals of the user.

In another embodiment, the goal analysis unit associates each goal the user is qualified to achieve with the user.

In another embodiment, the goal retrieval unit retrieves a plurality of tasks associated each associated goal.

In another embodiment, a goal maintenance unit presents a first task associated with a first goal to a user and tracking the completion of the first task.

In another embodiment, the goal maintenance unit presents a second task associated with the first goal to a user and tracking the completion of the second task.

In another embodiment, the goal maintenance unit presents a final task associated with the first goal to a user and tracking the completion of the final task.

In another embodiment, the goal maintenance unit indicates that a goal is complete when the final task is completed.

In another embodiment, each task in the plurality of tasks is associated with another task in the plurality of tasks.

In another embodiment, each task in the plurality of tasks is associated with at least one other goal.

In another embodiment, a goal modification unit modifies a goal based on previously completed goals.

Another embodiment of the present disclosure includes a goal tracking unit including a memory and a processor with a program operating in the memory that performs the steps of retrieving a listing of goals, with each goal having at least one prerequisite, retrieving a listing of completed goals related to a user, comparing the completed goal of the user with the prerequisite of the goal and determining if the user is qualified to achieve at least one goal from the listing of goals based on the completed goals of the user.

In another embodiment, the goal tracking unit performs the step of associating each goal the user is qualified to achieve with the user.

In another embodiment, the goal tracking unit performs the step of retrieving a plurality of tasks associated each associated goal.

In another embodiment, the goal tracking unit of claim 13 performs the step of presenting a first task associated with a first goal to a user and tracking the completion of the first task.

In another embodiment, the goal tracking unit performs the step of presenting a second task associated with the first goal to a user and tracking the completion of the second task.

In another embodiment, the goal tracking unit performs the step of presenting a final task associated with the first goal to a user and tracking the completion of the final task.

In another embodiment, the goal tracking unit performs the step of indicating a goal is complete when the final task is completed.

In another embodiment, each task in the plurality of tasks is associated with another task in the plurality of tasks.

In another embodiment, each task in the plurality of tasks is associated with at least one other goal.

In another embodiment, the goal tracking unit performs the step of modifying a goal based on previously completed goals.

BRIEF DESCRIPTION OF THE DRAWING

Details of the present invention, including non-limiting benefits and advantages, will become more readily apparent to those of ordinary skill in the relevant art after reviewing the following detailed description and accompanying drawings, wherein.

DETAILED DESCRIPTION OF THE INVENTION

While various embodiments of the present invention are described herein, it will be apparent to those of skill in the art that many more embodiments and implementations are possible that are within the scope of this invention. Accordingly, the present invention is not to be restricted except in light of the attached claims and their equivalents.

Described herein is a system for tendering freight to carriers by analyzing historical information on trucking lanes and carriers to determine which carriers are best suited to accept a shipping load. The system receives a request to haul a load from a shipper, matches the load with the appropriate carrier and presents the load for acceptance or rejection by the shipper. The system analyzes information pertaining to the load and a list of potential carriers to determine which carrier is best suited to haul the load.

Figure 1:
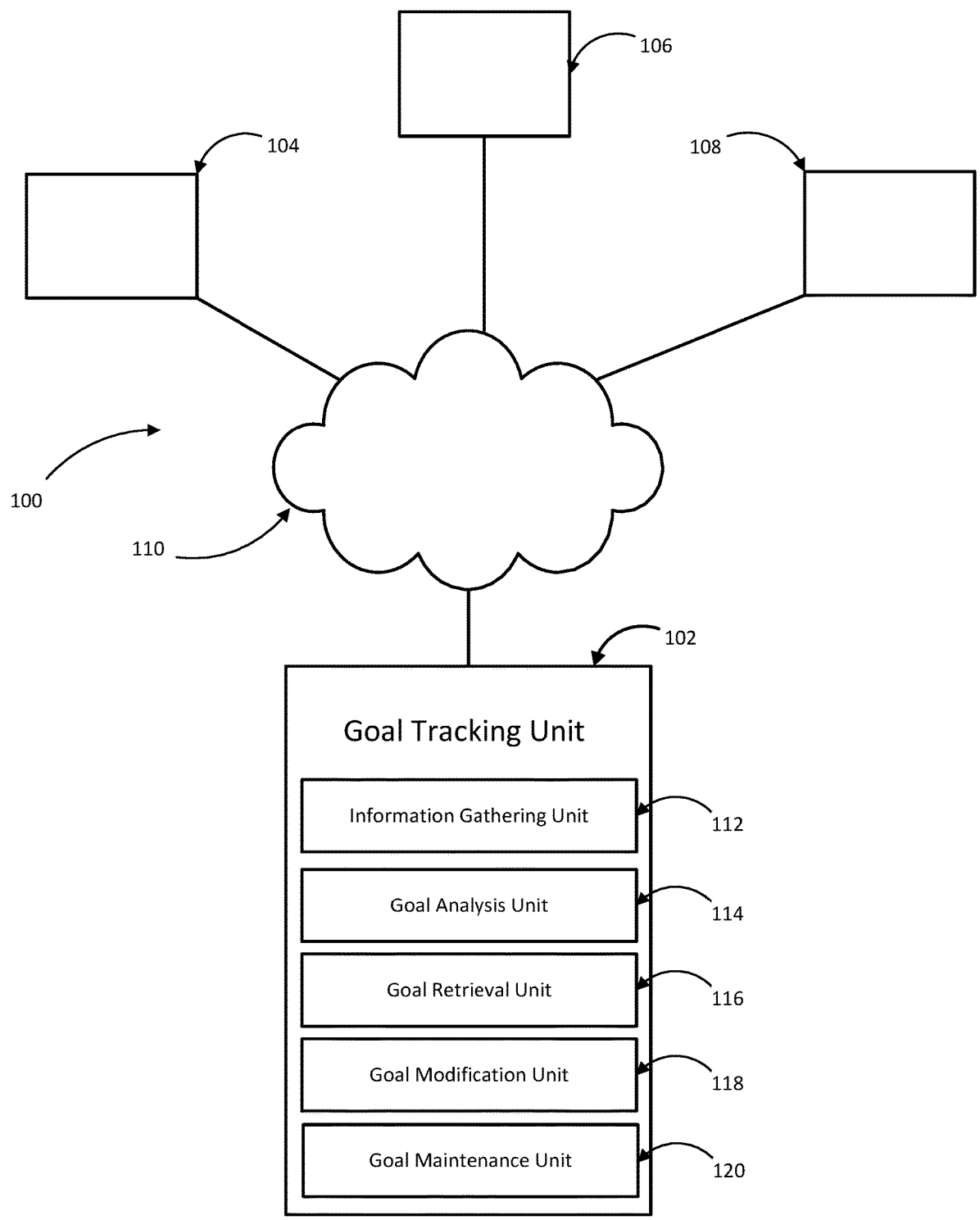
FIG. 1 depicts a block diagram of a goal tracking system suitable for use with the methods and systems consistent with the present invention.

FIG. 1 depicts a block diagram of a goal tracking system 100 suitable for use with the methods and systems consistent with the present invention. The goal tracking system 100 comprises a plurality of computers 102, 104, 106 and 108 connected via a network 110. The network 108 is of a type that is suitable for connecting the computers for communication, such as a circuit-switched network or a packet switched network. Also, the network 110 may include a number of different networks, such as a local area network, a wide area network such as the Internet, telephone networks including telephone networks with dedicated communication links, connection-less network, and wireless networks. In the illustrative example shown in FIG. 1, the network 110 is the Internet. Each of the computers 102, 104, 106 and 108 shown in FIG. 1 is connected to the network 110 via a suitable communication link, such as a dedicated communication line or a wireless communication link.

In an illustrative example, computer 102 serves as a goal tracking unit that includes an information gathering unit 112, a goal analysis unit 114, a goal retrieval unit 116, a goal modification unit 118, and a goal maintenance unit 120. The number of computers and the network configuration shown in FIG. 1 are merely an illustrative example. One having skill in the art will appreciate that the goal tracking system 100 may include a different number of computers and networks. For example, computer 102 may include the information gathering unit 112 as well as one or more of the goal analysis unit 114 and goal maintenance unit 120. Further, the goal retrieval unit 116 and goal modification unit 116 may reside on a different computer than computer 102.

Figure 2:
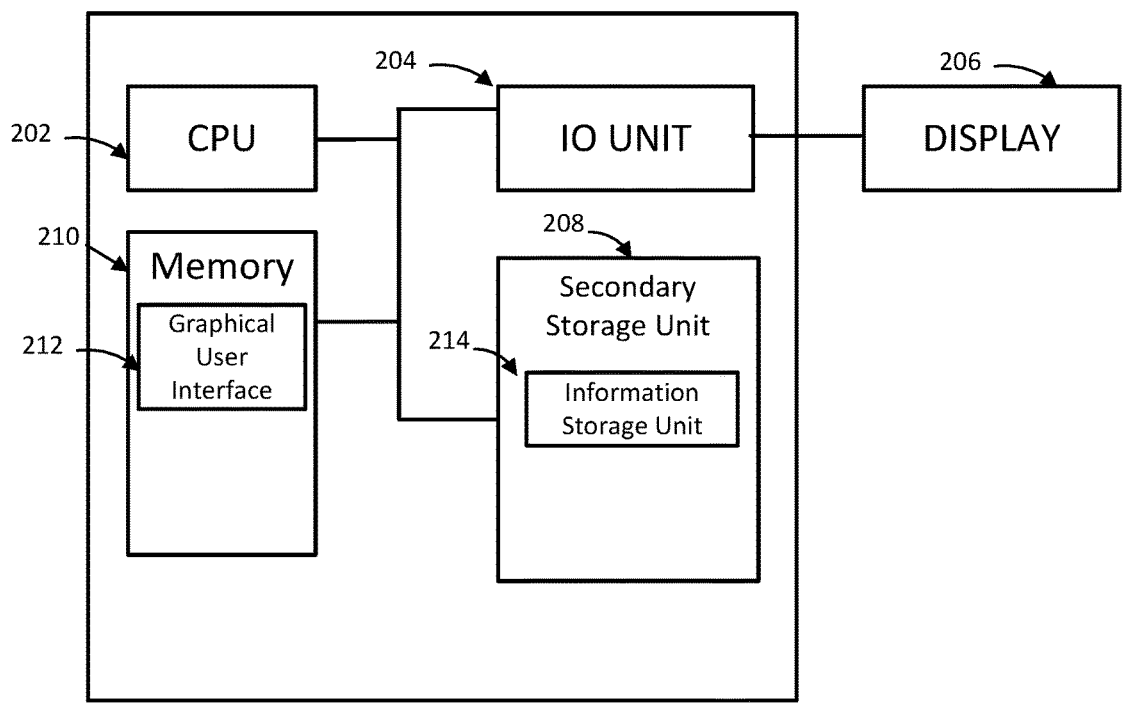
FIG. 2 depicts a more detailed depiction of the computer.

FIG. 2 depicts a more detailed depiction of the computer 102. The computer 102 comprises a central processing unit (CPU) 202, an input output (IO) unit 204, a display device 206 communicatively coupled to the IO Unit 204, a secondary storage device 208, and a memory 210. The computer 202 may further comprise standard input devices such as a keyboard, a mouse, a digitizer, or a speech processing means (each not illustrated).

The computer 102's memory 210 includes a Graphical User Interface ("GUI") 212 which is used to gather information from a user via the display device 206 and I/O unit 204 as described herein. The GUI 212 includes any user interface capable of being displayed on a display device 206 including, but not limited to, a web page, a display panel in an executable program, or any other interface capable of being displayed on a computer screen. The GUI 212 may also be stored in the secondary storage unit 208. In one embodiment consistent with the present invention, the GUI 212 is displayed using commercially available hypertext markup language ("HTML") viewing software such as, but not limited to, Microsoft Internet Explorer, Google Chrome or any other commercially available HTML viewing software. The secondary storage unit 208 may include an information storage unit 214. The information storage unit may be a rational database such as, but not including Microsoft's SQL, Oracle or any other database.

Figure 3:
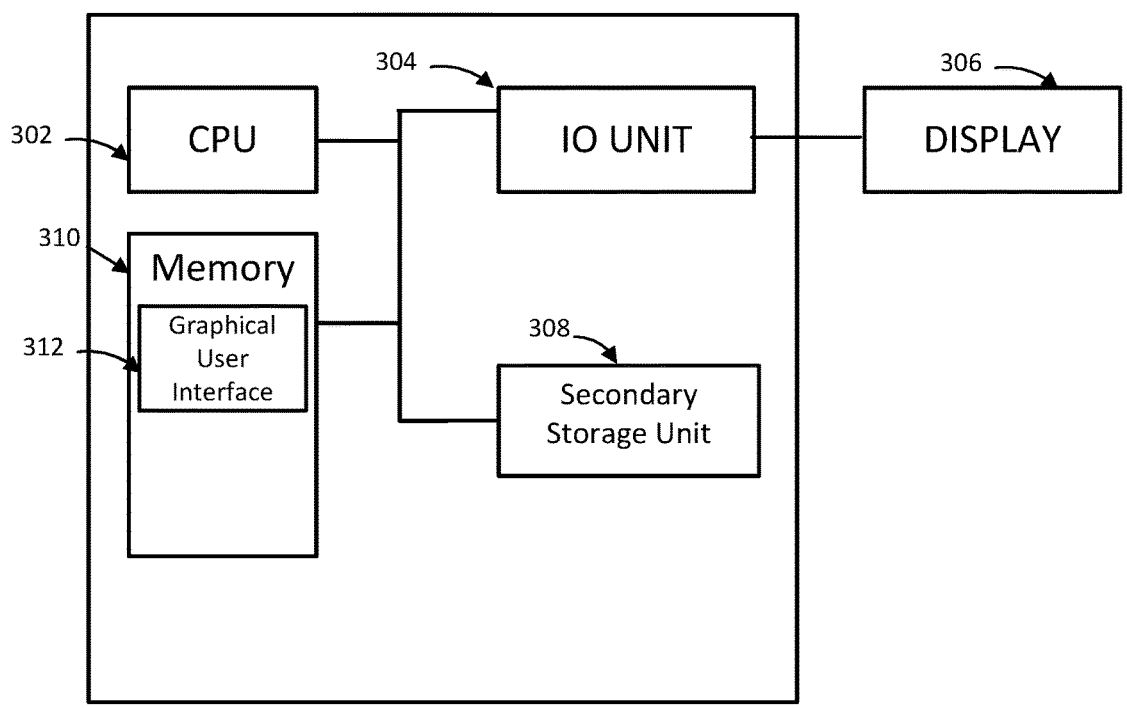
FIG. 3 shows a more detailed depiction of the computers.

FIG. 3 shows a more detailed depiction of the computers 104, 106 and 108. Each computer 104, 106 and 108 comprises a central processing unit (CPU) 302, an input output (I/O) unit 304, a display device 306 communicatively coupled to the IO Unit 304, a secondary storage device 308, and a memory 310. Each computer 104, 106 and 108 may further comprise standard input devices such as a keyboard, a mouse, a digitizer, or a speech processing means (each not illustrated).

Each computer 104, 106 and 108's memory 310 includes a GUI 312 which is used to gather information from a user via the display device 306 and I/O unit 304 as described herein. The GUI 312 includes any user interface capable of being displayed on a display device 306 including, but not limited to, a web page, a display panel in an executable program, or any other interface capable of being displayed on a computer screen. The GUI 312 may also be stored in the secondary storage unit 208. In one embodiment consistent with the present invention, the GUI 312 is displayed using commercially available hypertext markup language ("HTML") viewing software such as, but not limited to, Microsoft Internet Explorer, Google Chrome or any other commercially available HTML viewing software.

Figure 4:
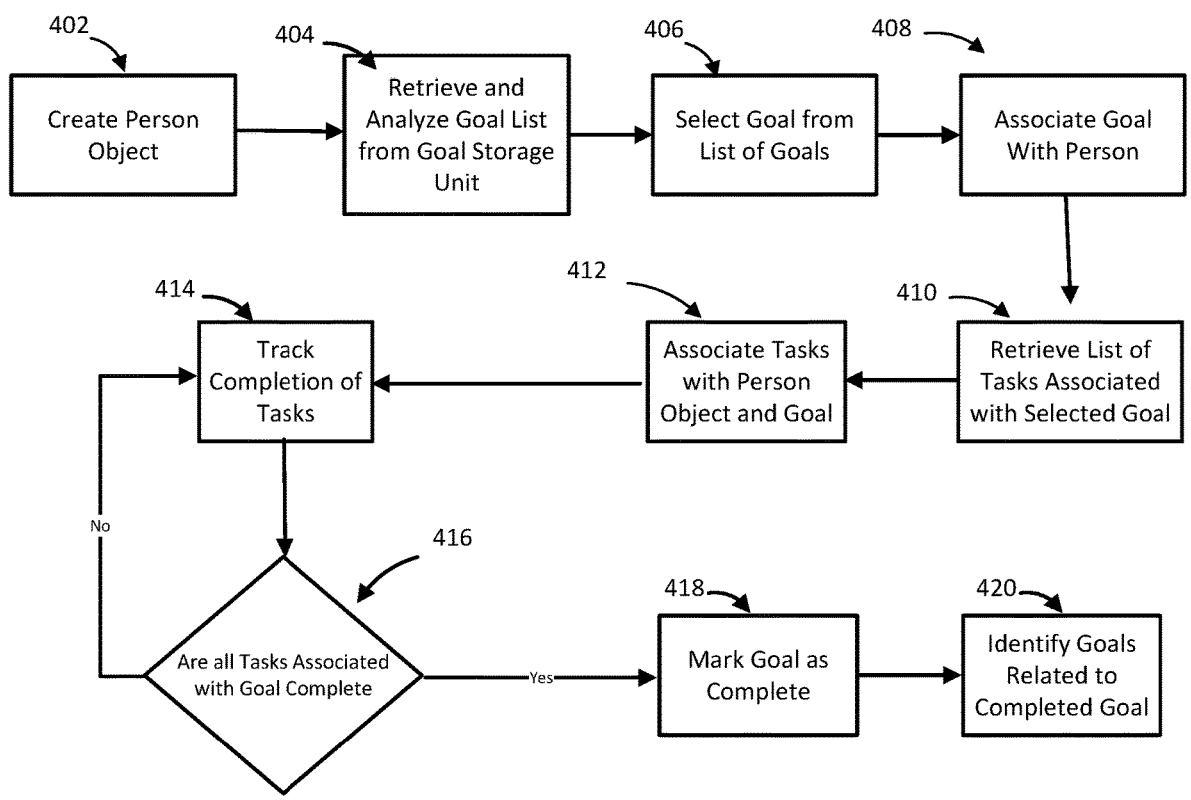
FIG. 4 depicts schematic description of the operation of the goal tracking system.

FIG. 4 depicts an schematic representation of the operation of the goal tracking unit. In step 402, the information gathering unit 112 creates a person object in the information storage unit 214. The person object contains information on the user working towards a goal including, but not limited to, the age, gender, location, educational background, desired goals, and any other information related to the user. In step 404, the goal analysis unit 114 retrieves the goals associated with the person object and analyzes the goals to determine if existing goals in the information storage unit 214 substantially match or overlap the goals of the person object. In step 406, a goal is selected from the list of goals associated with the person object. In step 410, the goal retrieval unit 116 retrieves a list of tasks associated with the goal from the information storage unit 214. The list of tasks may include a list of actions to be performed by a user in a specific order to complete a goal. As an illustrative example, a goal may be, but is not limited to, riding the bus to the grocery store unattended. The tasks associated with this goal may include researching the bus schedule, determining the proper route to take to get to the destination, identifying the appropriate time the bus arrives, and identifying the appropriate time the bus departs the store.

In step 412, the goal retrieval unit 116 associates the goal and the person object. In step 414, the goal retrieval unit 414 gathers information via the information gathering unit 112 on the tasks associated with the goal that the user has completed. The information gathering unit 112 may receive manual information from a user concerning the tasks completed. In another embodiment, the information gathering unit 112 monitors the geographic location and web site activity of the user to determine whether the user has completed a specific task. As an illustrative example, the information gathering unit 112 may be communicatively coupled to a Global Positioning System ("GPS") device that is associated with the user. In one embodiment, the GPS is connected to the I/O unit 204 of the computer 102. The information gathering unit 112 may gather location information on the user and correlate the location information with known locations of public transit to determine if the user has utilized a specific public transit bus or train. In addition, the GPS device may be used to track the path of the user from a base location to an end location and back to the base location. As another illustrative example, the information gathering unit 112 may monitor the web sites visited by the user to determine whether the user has accessed public transit web sites. The information gathering unit 112 may also determine whether the user has selected to proper public transit route to get to a desired location associated with the goal.

In step 416, the information gathering unit 112 determines whether the user has achieved each task associated with a specific goal. If the tasks are not complete, the information gathering unit 112 continues to monitor the progress of the user. In step 418, if each task is complete, the goal maintenance unit 120 marks the goal associated with the person object as being completed. In step, 420, the goal retrieval unit 116 retrieves a listing of goals associated with the completed goals, including goals requiring the completion of the completed goal, and presents the list of goals to the user.

Figure 5:
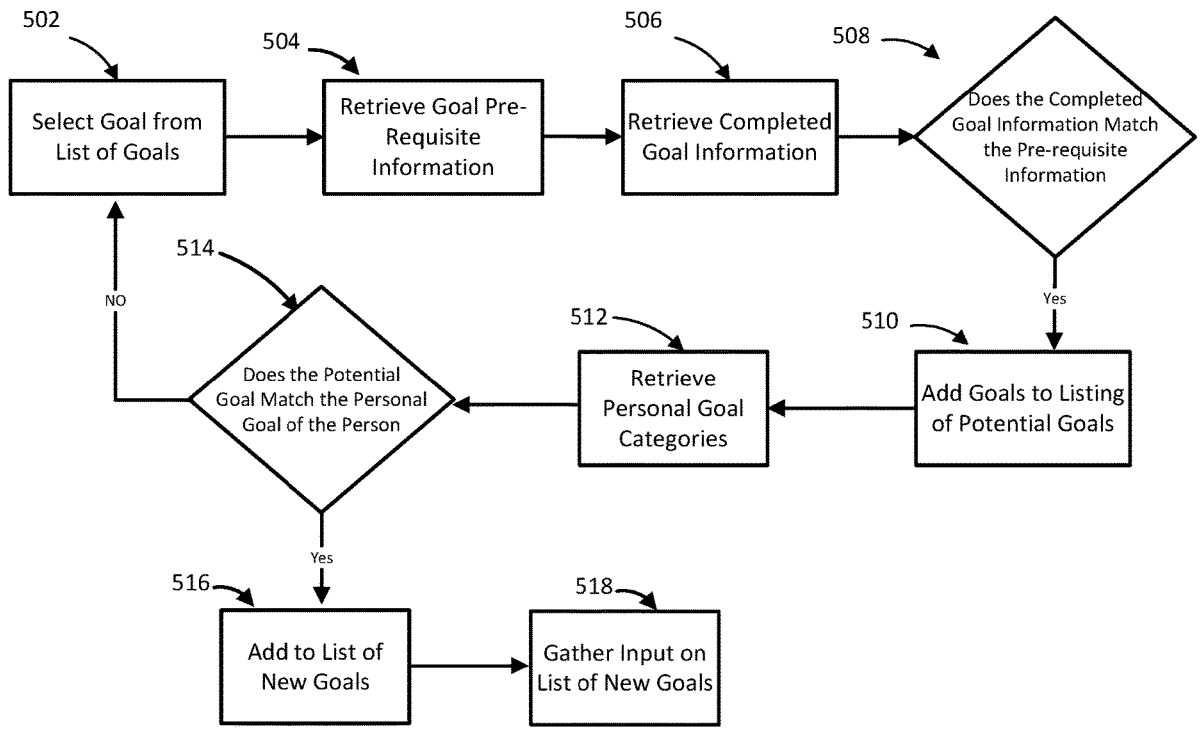
FIG. 5 depicts a schematic representation of the load acceptance unit automatically accepting a load request from a supplier.

FIG. 5 depicts a schematic representation of the process used to selects list of goals based on a user's history and preferences. In step 502, the goal retrieval unit 116 retrieves a goal from the information storage unit 214. In step 504, the goal retrieval unit 116 retrieves the prerequisites for each selected the goal. The prerequisites may include, but are not limited to, performance requirements such as previously completed goals, a predetermined age, or a predetermined physical characteristic such as a predetermined height or weight. In step 506, the goal retrieval unit 116 retrieves a list of completed goals and information associated with the person object. In step 508, the goal analysis unit 114 determines whether the information related to the person object user satisfies each pre-requisite of the selected goal. If the information does not match the pre requisite, a new goal is selected by the goal retrieval unit 116. In step 510, if the information does satisfy each pre-requisite of the selected goal, the goal retrieval unit 116 identifies the goal as a potential goal to present to the user. In step 512, the goal retrieval unit 116 retrieves information on the personal goals associated with the person object. The information on the personal goals associated with the person object may include, but is not limited to, specific goals the user wishes to accomplish. The personal goals may be assigned to one or more categories such as personal development, daily living or any other category that groups goals having shared characteristics together.

In step 514, the goal analysis unit 114 determines if the potential goal substantially matches the personal goals associated with the person object. The determination of whether the potential goal matches the personal goal of the person object may include categorizing, or retrieving the categories associated with, the potential goal and determining if the category of the potential goal matches at least one category of a goal associated with the person object. In one embodiment, the categories may include, but are not limited to, Wellness, Connections, Fun and Talents, Getting Around, Community Engagement, Earning Money, Household Duties and Lifelong Learning. In another embodiment, the goal associated with the person object and the potential goal are weighed based on different criteria such as which category of a plurality of categories the goal should be placed into. As an illustrative example, the goal of going to the grocery store unattended may score a high score for the category of Getting Around, such as a 10, and a lower score for the category of Household Duties, such as a 7. A potential goal such as walking to the park may also have a score of 10 for the Getting Around category which would indicate that the goal of walking to the park may be potential goal. In step 516, if the potential goal is a good match for the user, the potential goal is added to the list of new goals. In step 518, the information gathering unit 112 presents the list of new goals to the user and solicits input.

Figure 6:
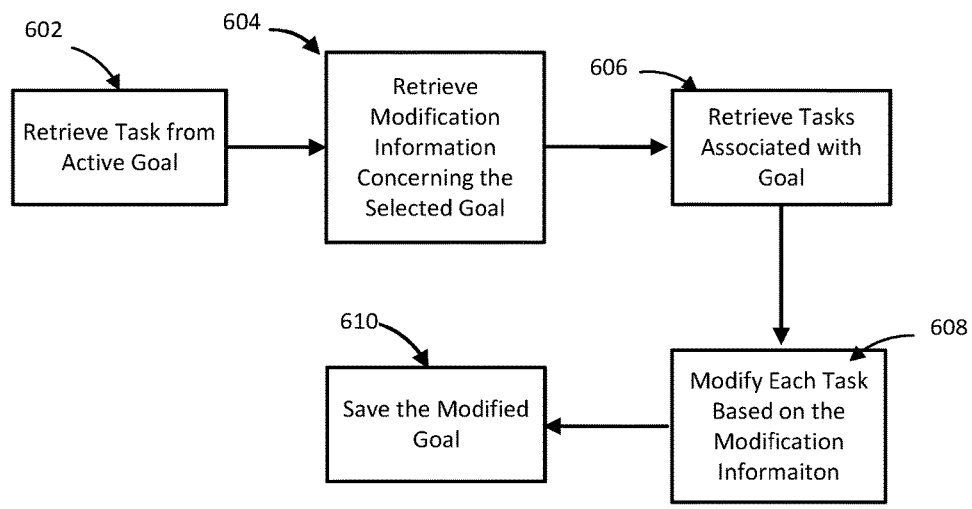
FIG. 6 depicts a schematic representation of the goal modification unit 118 modifying a goal.

FIG. 6 depicts a schematic representation of the goal modification unit 118 modifying a goal. In step 602, the goal modification unit retrieves the task list associated with a goal. In step 604, the information gathering unit 112 gathers information on the modifications to be made to the goal. The goal may be modified by revising, adding or deleting the tasks associated with the goal. In steps 606, the task or tasks of the goal to be modified are retrieved from the information storage unit 214. In step 608, each task associated with the goal is modified based on the modification information. In step 610, the goal is stored in the information storage unit 214 as a new goal.

In the present disclosure, the words "a" or "an" are to be taken to include both the singular and the plural. Conversely, any reference to plural items shall, where appropriate, include the singular.

It should be understood that various changes and modifications to the presently preferred embodiments disclosed herein will be apparent to those skilled in the art. Such changes and modifications can be made without departing from the spirit and scope of the present disclosure and without diminishing its intended advantages. It is therefore intended that such changes and modifications be covered by the appended claims.

The invention claimed is:

1. A goal tracking system including a goal tracking unit including:
    an information gathering unit that gathers information related to a user and a listing of tasks completed by a user;
    a goal retrieval unit that retrieves a listing of goals logically related to the listing of tasks completed by the user, where the goal includes a physical activity for the user to complete;
    a goal analysis unit that assigns a goal from the listing of goals for the user to complete based on the user's completed tasks,
    wherein the goal retrieval unit, via the information gathering unit, gathers information, including location information of the user via a global positioning unit, related to the progress of the user in completing the goal, and
    the goal analysis unit monitors the location of the user to generate a path taken by the user and the goal analysis unit analyzes the path taken by a user using the location information from the global positioning system to determine whether the user deviated from an estimated path to complete the goal,
    the goal analysis unit modifies the tasks associated with the goal based on identified path of the user, and
    the goal retrieval unit selects additional goals from the list of goals based on the progress of the user completing the goal.

2. The goal tracking system of claim 1 wherein the goal analysis unit associates each goal the user is qualified to achieve with the user.

3. The goal tracking system of claim 2 wherein the goal retrieval unit retrieves a plurality of tasks associated each associated goal.

4. The goal tracking system of claim 3 including a goal maintenance unit that presents a first task associated with a first goal to a user and tracking the completion of the first task.

5. The goal tracking system of claim 4 wherein the goal maintenance unit presents a second task associated with the first goal to a user and tracking the completion of the second task.

6. The goal tracking system of claim 5 wherein the goal maintenance unit presents a final task associated with the first goal to a user and tracking the completion of the final task.

7. The goal tracking system of claim 6 wherein the goal maintenance unit indicates that a goal is complete when the final task is completed.

8. The goal tracking system of claim 3 wherein each task in the plurality of tasks is associated with another task in the plurality of tasks.

9. The goal tracking system of claim 8 wherein each task in the plurality of tasks is associated with at least one other goal.

10. The goal tracking system of claim 1 including a goal modification unit that modifies a goal based on previously completed goals.

11. A goal tracking unit including a memory and a processor with a program operating in the memory that performs the steps of:
gathering information related to a user and a listing of tasks completed by the user;
retrieving a listing of goals logically related to the listing of tasks completed by the user, where the goal includes a physical activity for the user to complete;
assigning a goal from the listing of goals for the user to complete based on the user's completed tasks; and
determining if the user is qualified to achieve at least one goal from the listing of goals based on the completed goals of the user,
gathering information, including location information of the user via a global positioning unit, related to the progress of the user in completing the goal,
monitoring the location of the user to generate a path taken by the user and the goal analysis unit analyzing the path taken by a user using the global positioning unit to determine whether the user deviated from an estimated path to complete the goal, and
selecting additional goals from the list of goals based on the progress of the user completing the goal.

12. The goal tracking unit of claim 11 performs the step of associating each goal the user is qualified to achieve with the user.

13. The goal tracking unit of claim 12 performs the step of retrieving a plurality of tasks associated each associated goal.

14. The goal tracking unit of claim 13 performs the step of presenting a first task associated with a first goal to a user and tracking the completion of the first task.

15. The goal tracking unit of claim 14 performs the step of presenting a second task associated with the first goal to a user and tracking the completion of the second task.

16. The goal tracking unit of claim 15 performs the step of presenting a final task associated with the first goal to a user and tracking the completion of the final task.

17. The goal tracking unit of claim 16 performs the step of indicating a goal is complete when the final task is completed.

18. The goal tracking unit of claim 13 wherein each task in the plurality of tasks is associated with another task in the plurality of tasks.

19. The goal tracking unit of claim 18 wherein each task in the plurality of tasks is associated with at least one other goal.

20. The goal tracking unit of claim 11 performs the step of modifying a goal based on previously completed goals.

* * * * *